Figure 1:
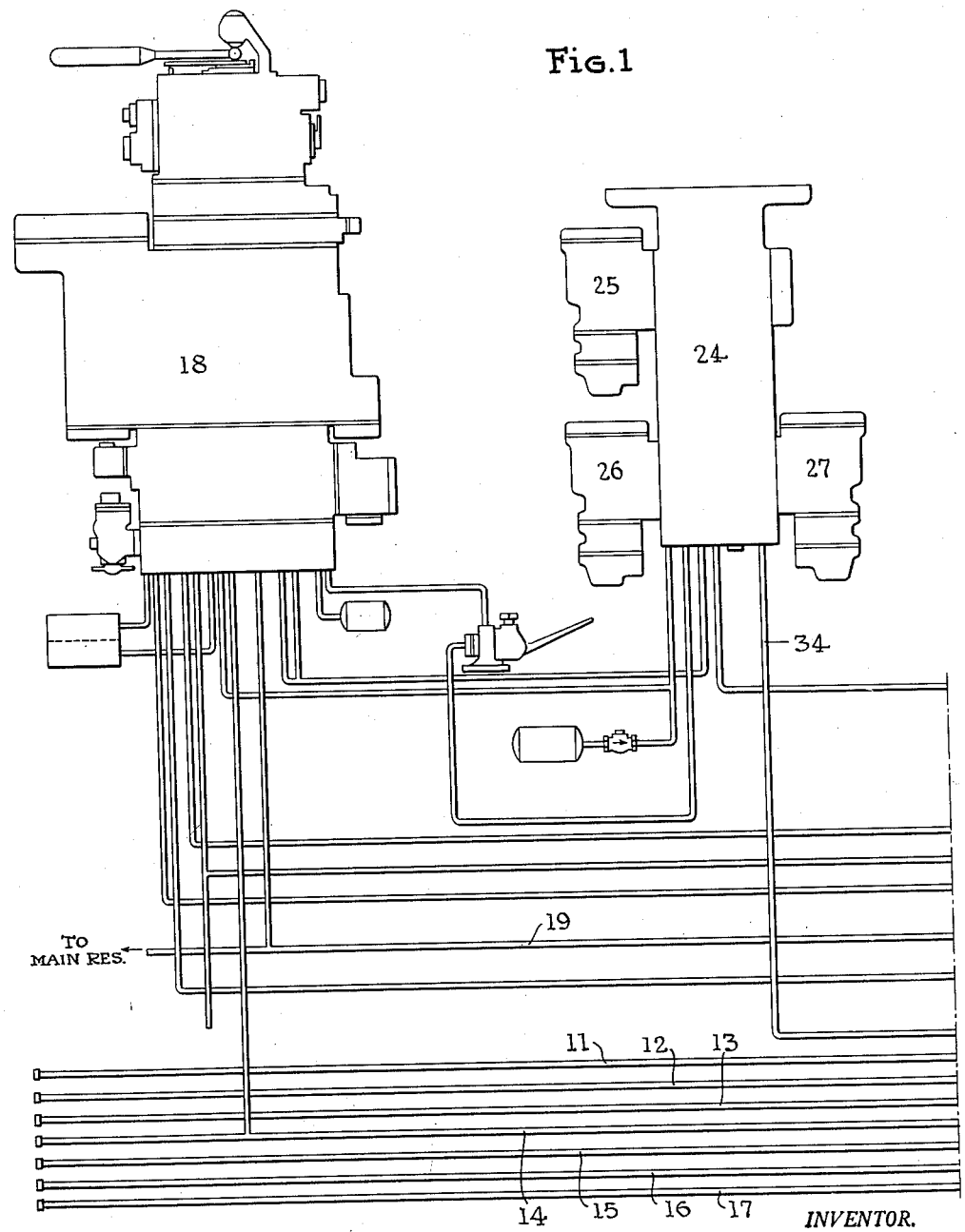

Jan. 5, 1954 J. V. V. ELSWORTH 2,665,173
AIR BRAKE
Filed July 23, 1951 5 Sheets-Sheet 1

INVENTOR.
John V. V. Elsworth
BY
Attorneys

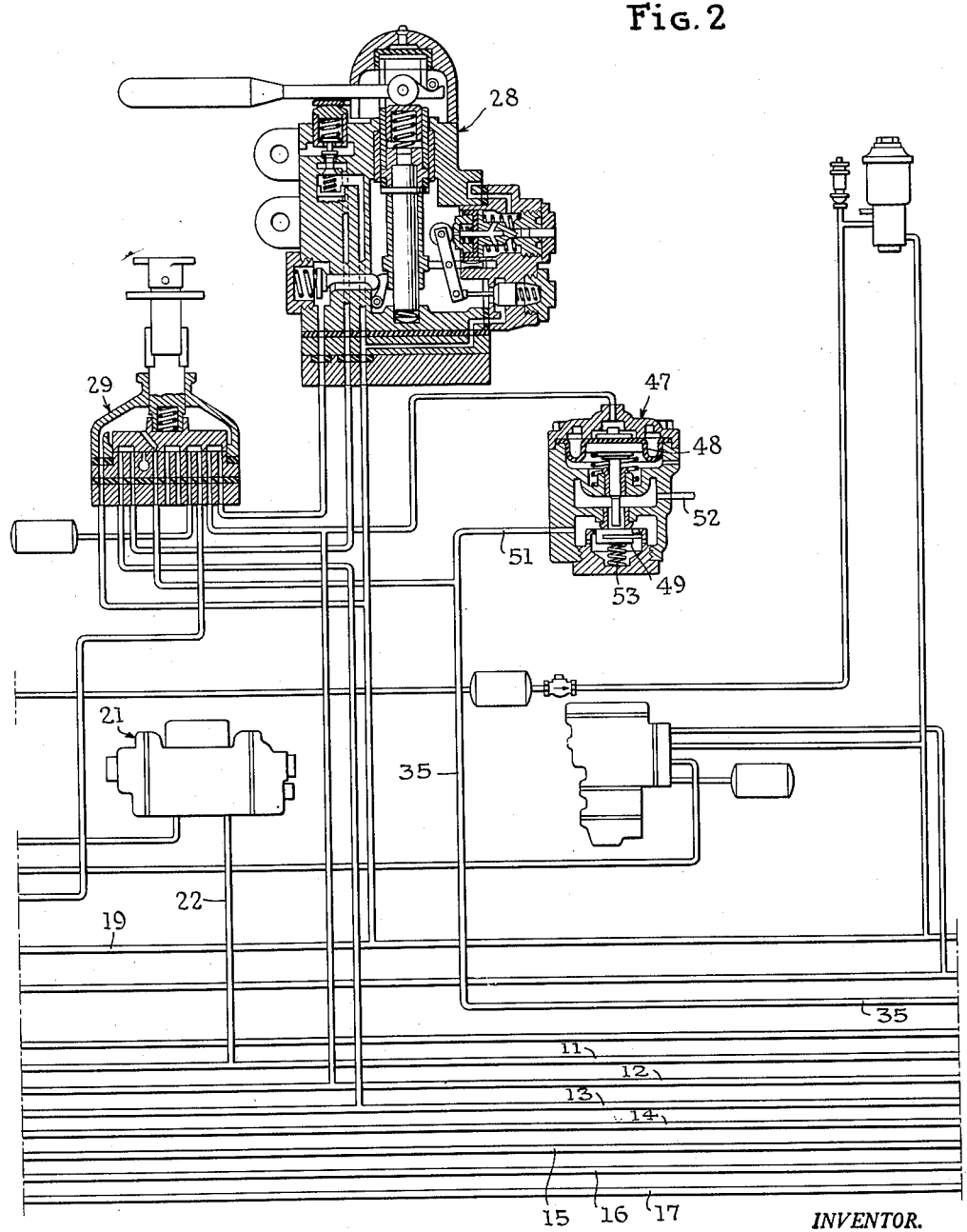

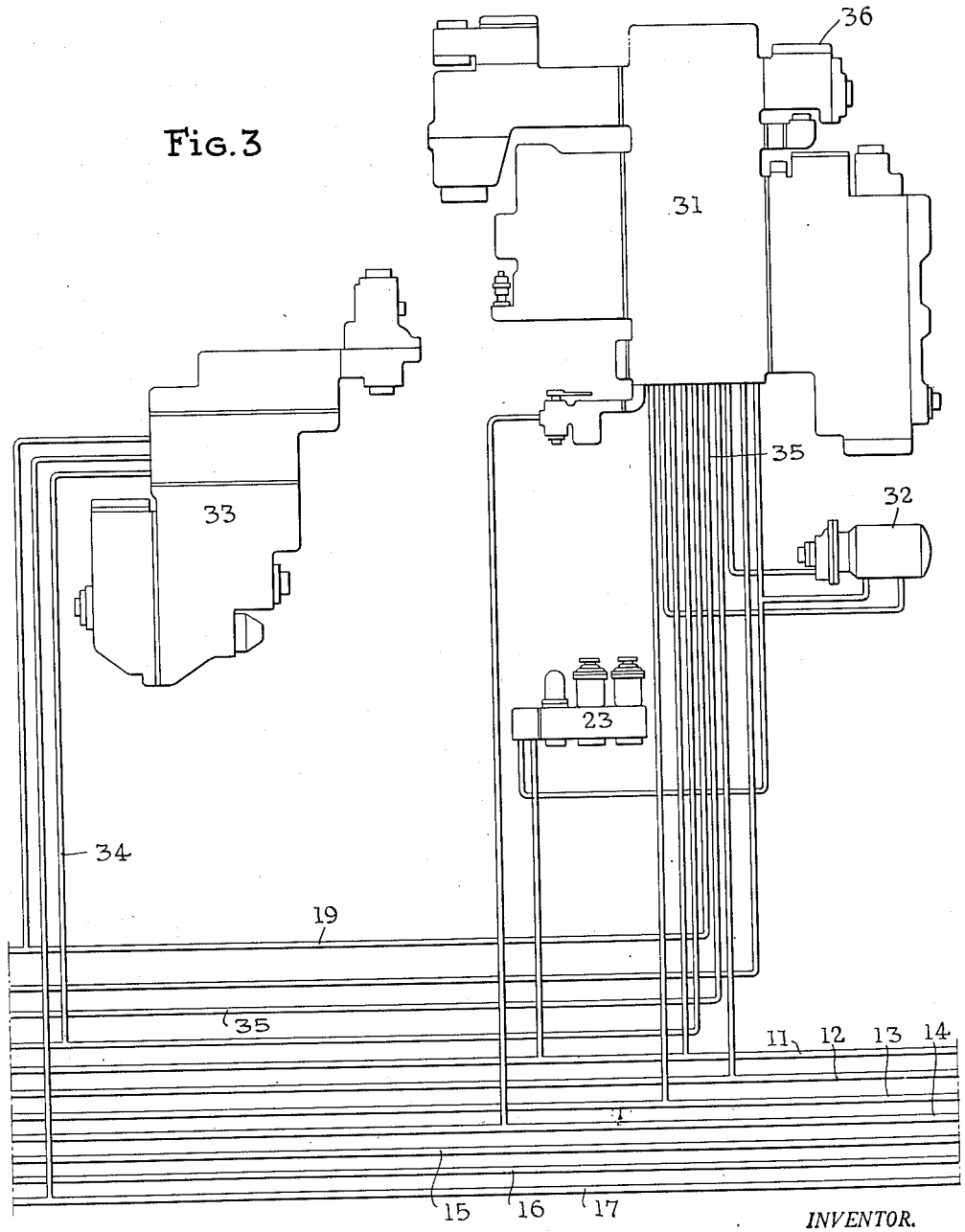

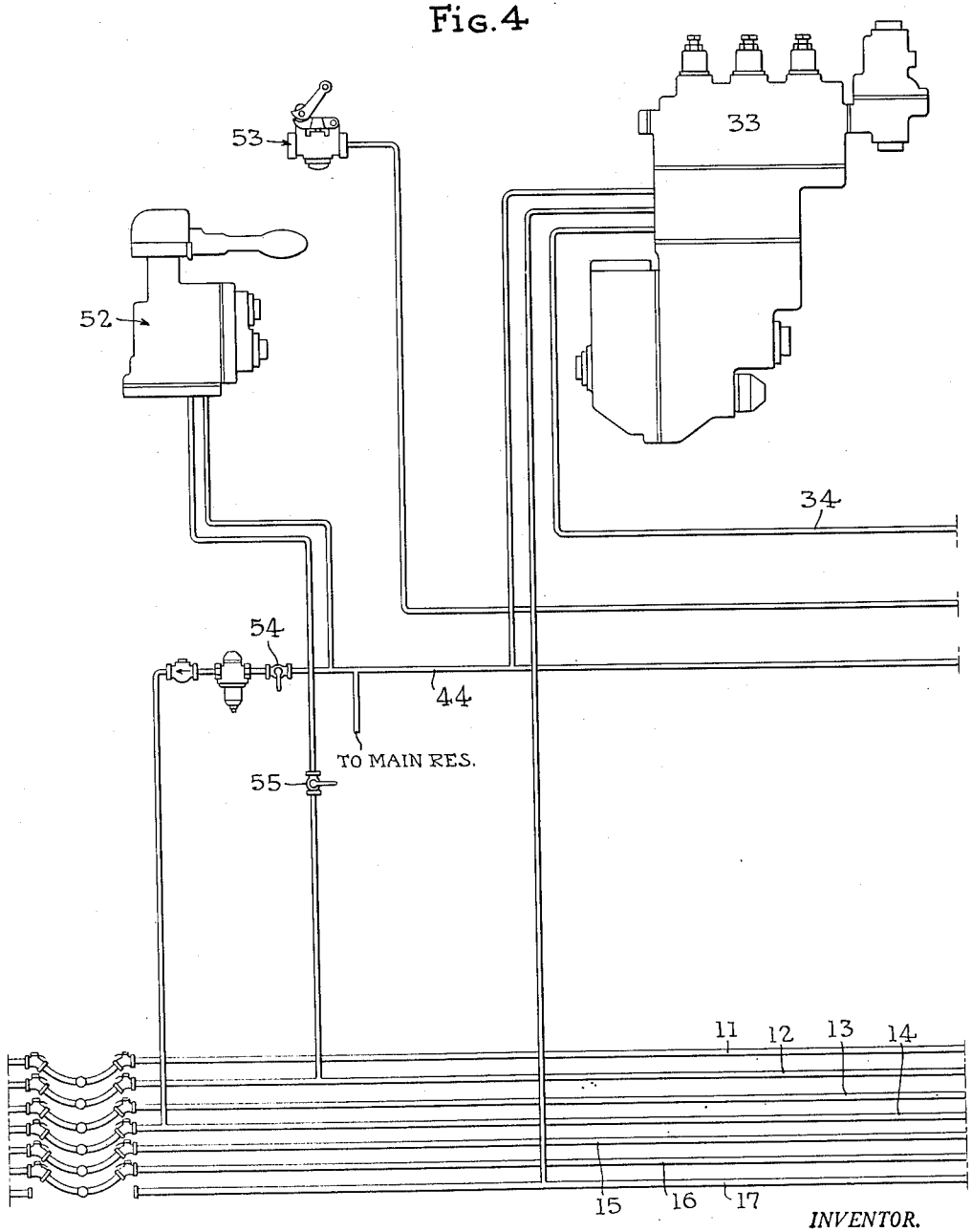

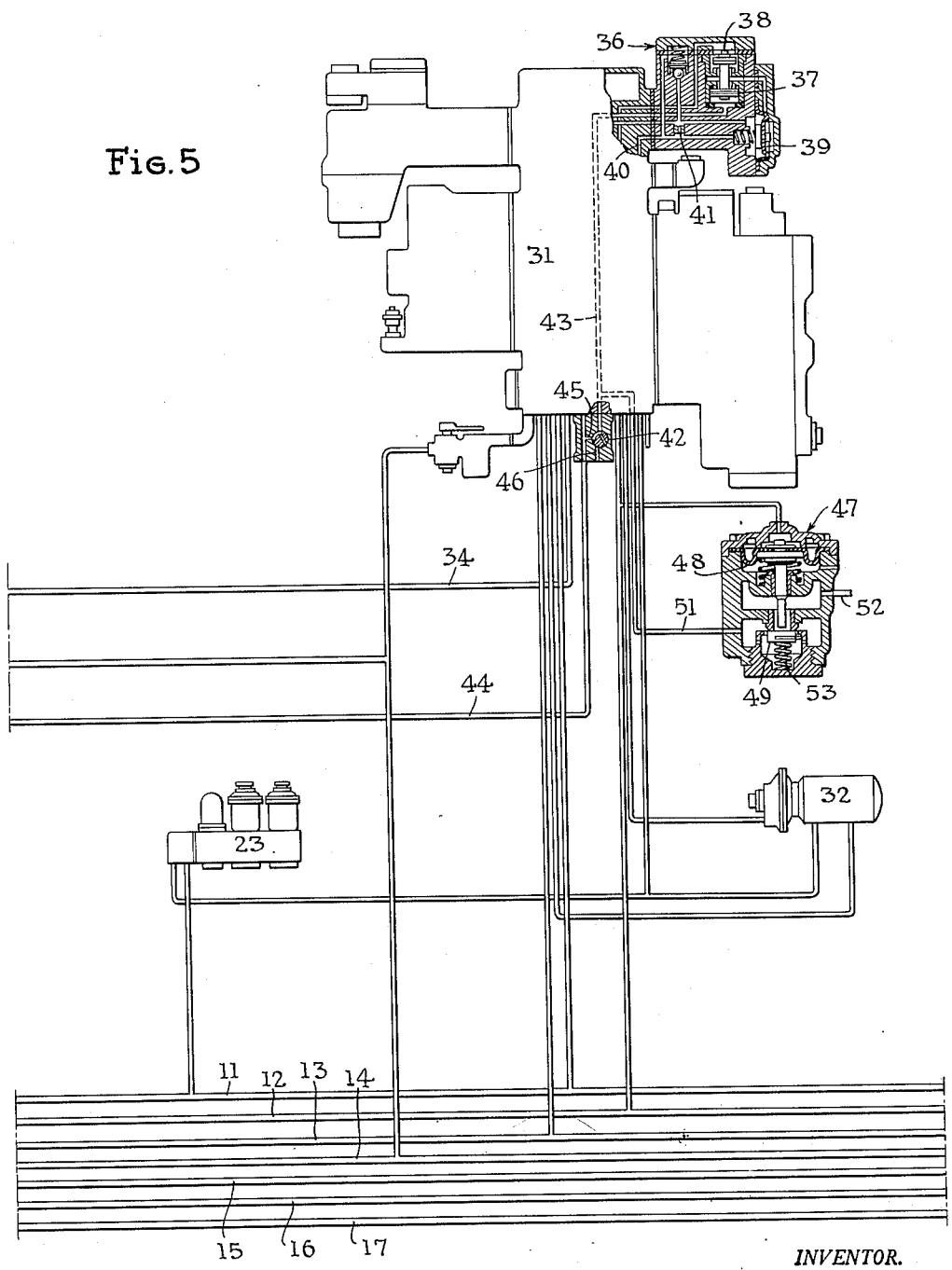

Patented Jan. 5, 1954

2,665,173

UNITED STATES PATENT OFFICE 2,665,173

AIR BRAKE

John Van Varick Elsworth, Watertown, N. Y., assignor to The New York Air Brake Company, a corporation of New Jersey Application July 23, 1951, Serial No. 238,150

3 Claims. (Cl. 303—40)

This invention relates to air brakes and particularly to apparatus for use in conjunction with brake controlling systems having a controlled emergency feature. The invention concerns automatic means operable to suspend this control feature under certain operating conditions.

The controlled emergency feature has become a standard part of air brake systems, but its primary usefulness is present when the brakes on a long train are to be controlled. The purpose of the controlled emergency feature is to retard the build-up of pressure in the locomotive brake cylinder during an emergency application of the brakes. This retardation prevents harsh slack action which occurs as a result of the cars in a long train running in on the locomotive or locomotives.

While existing systems are provided with manually operable means whereby the controlled emergency feature may be cut out, it is desirable that a system be provided which would be automatic in its operation and which when controlled by a single actuating means operate to suspend the controlled build-up on both the leading and trailing units of multi-unit locomotives.

One approach to the problem would be to employ an actuating means and piping which could be trainlined through the locomotive units. This solution is not practical because the objection to additional piping running between the units would prevent its being adopted.

According to the present invention the problem is solved without the use of any additional connections between the units and with only the addition of a single pneumatic relay on each locomotive unit.

The invention will be described as it is embodied in the well known number 24 RL brake equipment. The control valves on the various locomotive units each includes a controlled emergency portion. When used with passenger trains or as a light locomotive in the yard or terminals, it is undesirable that the locomotive brake cylinder pressure should develop at a retarded rate during an emergency application. Manual control means are provided which may be adjusted so that the parts of the controlled emergency portion are so positioned that pressure development in the brake cylinder is not retarded.

The manual control means take two forms depending upon the type of unit on which it is installed. An "A" unit is a locomotive which is equipped with propulsion units and a complete brake controlling system and may be used as either a leading or trailing unit in a multiple unit locomotive. A "B" unit is a locomotive which includes propulsion units but does not include all of the brake valves characteristic of an "A" unit. A "B" unit is used as a trailing unit in a multi-unit locomotive. Its braking system is normally controlled by the "A" unit with which it is operated. When operated as a light locomotive in the terminal or yard, the brakes on a "B" unit are controlled by a hostler's valve during service applications of the brakes and by a conductor's valve during emergency applications.

In an "A" unit the controlled emergency feature is governed by the position of a rotair valve through which the controlled emergency pipe leading to the controlled emergency portion of the control valve is either charged or vented. In a "B" unit the control valve is provided with a so-called controlled emergency cock. This is a two position cock which is selectively positioned to vent or to charge the controlled emergency passage.

When the controlled emergency feature is desired with the prior art arrangement the rotair valve and the controlled emergency cock are positioned so as to admit air to the controlled emergency pipe. It frequently happens that in changing from one type of service to another the engineer fails to change the setting of the controlled emergency cock and the rotair valve. According to the present invention a pneumatic relay valve is provided which may be connected to the controlled emergency pipe. The pressure which controls the relay valve's operation is admitted from the application and release pipe which is charged whenever an application of the locomotive brakes is initiated by the independent brake valve or by the hostler's valve on a "B" unit. This relay valve is normally closed, but is opened to vent the controlled emergency pipe when the pressure in the independent application and release pipe reaches a predetermined amount.

Since the controlled emergency pipe extends only through the leading unit of a multiple unit locomotive, when a K2A rotair valve is employed, each unit must include a pneumatic relay by which the charging and venting of the controlled emergency pipe may be controlled. When the controlled emergency pipe is vented, an emergency application of the brakes will be characterized by a rapid development of pressure in the brake cylinders of the locomotive.

An embodiment of the invention will be described having reference to the accompanying drawings. Figures 1 through 5 when arranged side by side from left to right in the order of the figure numbers produce a diagram of the braking system of a two unit locomotive. Certain components are shown in elevation and others wholly or partially in section.

The invention is illustrated as it would be embodied in the number 24 RL brake equipment. These drawings are a somewhat simplified version of this equipment as shown in plates A-1 and J of Instruction Pamphlet No. 59, published by the New York Air Brake Company. A copy of this pamphlet is part of the record in Elsworth Patent No. 2,540,078, dated February 6, 1951.

Figures 1-3 constitute the diagram of the braking equipment on an "A" unit, excepting the hose couplings between units which appear in Figure 4, and Figures 4 and 5 the equipment on a "B" unit.

The pipes which extend from end to end through a multiple unit locomotive are the straight air pipe 11, the application and release pipe 12, the actuating pipe 13, the automatic brake pipe 14, the main reservoir pipe 15, and the signal pipe 16. A brake cylinder connection 17 is provided on each unit, but it is not trainlined. The brake cylinders, supplied through the brake cylinder connection 17, are conventional and are therefore not illustrated.

The equipment on the leading unit includes an engineer's brake valve 18 which is connected with the main reservoir supply 19, the brake pipe 14, and the master controller 21. This controller controls the charging and venting of the straight air pipe 11 through a branch line 22. This controller also includes electrical contacts, not visible, that control the operation of the magnetic relay 23 on the trailing or "B" unit. The relay 23 controls the charging and venting of the straight air pipe 11 on the trailing unit. The straight air pipe 11 communicates between units through a restriction. This provides a safety feature to assure braking on each unit even if the relay 23 on that unit should malfunction.

The relayair valve 24 and its associated relays 25, 26, and 27 are part of the automatic safety devices provided in the braking equipment. The function of the valve 24 is not involved in the present invention.

Reference numeral 28 indicates an independent brake valve of the conventional self-lapping type. The brake valve 28 serves to charge the application and release pipe 12 from the main reservoir line 19 or to vent the pipe 12. Associated with the brake valve 28 is the rotair valve 29, through the setting of which the operational characteristics of the system may be controlled to meet service requirements, e. g. freight or passenger service.

Each of the units includes a control valve 31. In the illustrated embodiment the well known D-24 control valve is shown. Associated with each control valve 31 are a combined reservoir 32, which includes an auxiliary reservoir, an emergency reservoir, and a displacement volume, and a relay valve 33. Operation of the control valve 31 is controlled by the pressure in the brake pipe 14 and determines the pressure in relay valve control pipe 34. The pipe 34 in the lead unit is connected with the relayair valve 24 as well as with the relay 33 and the control valve 31.

On the leading or "A" unit is controlled emergency pipe 35 extends between the rotair valve 29 and the controlled emergency portion 36 of the control valve 31. The controlled emergency portion 36, as shown in Figure 5, includes a piston 37 which controls a valve 38. Valve 38 in turn controls the charging of the space behind the diaphragm valve 39. The charging of this space determines whether the relay control pipe 34 is charged from passage 40 through the choke 41 at a restricted rate or past valve 39 at relatively unrestricted rate. The air flowing through passage 40 comes from the emergency and auxiliary reservoirs.

The control valve 31 on the trailing or "B" unit includes a controlled emergency cock 42 through which the controlled emergency passage 43 may be charged from a main reservoir line 44. This charging flow passes through a resertiction 45. In its other operating position the cock 42 is effective to vent the passage 43 through the exhaust connection 46.

The trailing unit includes a hostler's valve 52, which may be functionally connected with the main reservoir pipe 44 and the application and release pipe 12. The hostler's valve 52 is used to control the locomotive brakes on the "B" unit during switching operations and the like. An emergency application of the brakes on a "B" unit and associated cars or "A" units can be initiated by opening the conductor's valve 53 which will vent the brake pipe 14. Cut-out cocks 54 and 55 are provided. The cock 54, when closed, prevents charging of the brake pipe 14 from the main reservoirs on the "B" unit. Pressure in the brake pipe 14 is controlled on the "A" unit in a multi-unit locomotive. The cock 55, when closed, suspends the operation of the hostler's valve 52. The cocks 54 and 55 are closed as shown when the "B" unit is operated as part of a multiple unit locomotive.

The equipment described above is conventional and it is capable of operation in its usual manner, except as modified by the present invention.

The locomotive units are each provided with a diaphragm operated valve unit 47. The valve units 47 comprise a motor diaphragm 48 and a valve 49. The valve unit 47 has an inlet connection 51 from the controlled emergency pipe 35 and an exhaust connection 52. The valve 49 is normally biased against its seat by a spring 53, thus inhibiting exhaust flow through the valve 49. The motor diaphragm 48 is subject on one face to the pressure in the application and release pipe 12. On the leading unit the valve unit 47 is placed near the rotair valve 29 through which the controlled emergency pipe 35 is charged at a restricted rate. On the trailing or "B" unit the valve unit 47 is located near the control valve 31. The function of the two units 47 is the same, it being required only that the inlet 51 be connected to the controlled emergency pipe 35 or passage 43 so as to vent that pipe when the application and release pipe 12 is charged.

The rotair valve 29 and the controlled emergency cock 42 are shown in their freight positions in the drawings. With these parts in these positions, the controlled emergency pipe 35 and the controlled emergency passage 43 are charged with main reservoir air. The motor piston 37 is, therefore, in its upper position, so that the valve 38 is held open. If a service application of the brakes is made by manipulating the engineer's brake valve 18, the pressure in the relay control pipe 34 builds up at its normal unrestricted rate through appropriate ports in the control valve 31.

As a result brake cylinder pressure is permitted to develop at normal rate by action of the relay 33. An emergency application of the brakes on the other hand is characterized by a retarded build up of brake cylinder pressure, because the control pipe 34 is charged at a restricted rate through the choke 41 when controlled emergency pipe 35 and the passage 43 are under pressure. This causes the relay 33 to retard the pressure development in the brake cylinder connection 17.

When it is desired to detach the locomotive from the train, the rotair valve 29 and the controlled emergency cock 42 should be put in passenger position so that the controlled emergency feature is nullified. It frequently happens that this changeover is not made. If uncorrected the locomotive brakes during an emergency application will be applied by a pressure which will develop at a retarded rate, thus increasing the stopping distance. The valve units 47 are intended to suspend this controlled emergency feature under certain conditions, regardless of the setting of the rotair valve 29 and of the cock 42.

If the multiple locomotive unit is being run light, i. e., without a train of cars, the brakes will be operated by the independent brake valve 28 on an "A" unit during normal service operations. When an application of the brakes is made, the application and release pipe 12 is charged with air. This air charges the control pipe 34 through the control valve 31. The pressure in the pipe 12 is used according to the present invention, to pilot the valve units 47. When this pressure reaches a chosen amount, say 25 pounds per square inch, the valves 49 are unseated thereby opening an exhaust 52 and venting the controlled emergency pipe 35 and the passage 43. Since the pipe 35 and passage 43 are charged from the main reservoir at a restricted rate the loss of charging air flowing into these pipes when vented by the valve units 47 is kept to a minimum. An emergency application of the brakes under this condition takes place at an unretarded rate because the diaphragm 39 in controlled emergency position 36 is not seated, whereby flow of auxiliary and emergency reservoir air through passage 40 to control pipe 34 does not have to pass through the choke 41.

It will be seen that the invention operates to suspend the controlled emergency feature whenever the application and release pipe 12 is charged. When the pipe 12 is vented the charging and venting of the controlled emergency pipe 35 and of the passage 43 are controlled respectively by the rotair valve 29 and the controlled emergency cock 42.

This controlled emergency suspension is available on any locomotive equipped with the invention whether it is operating a light locomotive or as a trailing or leading unit in a multiple unit locomotive.

An emergency application of the brakes is made by venting the brake pipe 14 whether the brake system is operating as an electro-pneumatic straight air or automatic system. An emergency application on a "B" unit is initiated by opening the conductor valve 53 to vent the brake pipe 14.

It will be understood that the use of the invention is not limited to multiple unit locomotives. When used in a multiple unit installation it provides automatic suspension of the controlled emergency feature on all of the units through charging of the application and release pipe 12.

Although the multiple unit locomotive brake equipment has been illustrated as it exists on a two unit locomotive, there may be several trailing units making up a single locomotive and each may be equipped with the invention. The independent brake valve on the leading unit will serve to actuate the pneumatic relay valve on each unit, because the application and release pipe extends through the entire locomotive unit.

The invention is not limited to use with the illustrated number 24 RL brake equipment and no such limitation is implied other than is expressed in the appended claims.

What is claimed is:

1. A locomotive brake system comprising a normally charged brake pipe; means operable to vent said brake pipe; a control valve functionally connected with said brake pipe; an application and release pipe; an independent brake valve operable to charge and to vent said application and release pipe; a brake cylinder functionally connected with said control valve and with said application and release pipe; a controlled emergency pipe; means operable to charge said controlled emergency pipe at a restricted rate; controlled emergency means effective when actuated to restrict the rate of development of pressure in said brake cylinder during an emergency application of the brakes, said means being actuated when said controlled emergency pipe is charged; a normally closed valve; and a pressure actuated motor having a charging connection from said application and release pipe and effective when charged to open said valve and thereby vent said controlled emergency pipe.

2. The combination defined in claim 1 in which the means to vent the brake pipe comprises a conductor's valve.

3. The combination defined in claim 1 in which the means to vent the brake pipe comprises an engineer's brake valve.

JOHN VAN VARICK ELSWORTH.

References Cited in the file of this patent

UNITED STATES PATENTS

| Number | Name | Date |
|---|---|---|
| 2,058,016 | Hewitt | Oct. 20, 1936 |
| 2,106,479 | Fitch | Jan. 25, 1938 |
| 2,130,620 | Hewitt | Sept. 20, 1938 |